(12) United States Patent
Eirea

(10) Patent No.: US 11,374,493 B2
(45) Date of Patent: Jun. 28, 2022

(54) CIRCUIT AND METHOD FOR ADJUSTING AN INDUCTOR CURRENT IN A POWER CONVERTER

(71) Applicant: SEMICONDUCTOR COMPONENTS INDUSTRIES, LLC, Phoenix, AZ (US)

(72) Inventor: Gabriel Eirea, Cupertino, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 188 days.

(21) Appl. No.: 16/811,409

(22) Filed: Mar. 6, 2020

(65) Prior Publication Data
US 2021/0281173 A1    Sep. 9, 2021

(51) Int. Cl.
*H02M 3/158* (2006.01)
*H02M 1/00* (2006.01)

(52) U.S. Cl.
CPC .............. *H02M 3/158* (2013.01); *H02M 1/00* (2013.01); *H02M 1/0009* (2021.05); *H02M 1/009* (2021.05)

(58) Field of Classification Search
CPC ........ H02M 3/158; H02M 1/00; H02M 1/009; H02M 1/0009
See application file for complete search history.

(56) References Cited

U.S. PATENT DOCUMENTS

| | | | |
|---|---|---|---|
| 2004/0201281 A1 | 10/2004 | Ma et al. | |
| 2008/0231115 A1 | 9/2008 | Cho et al. | |
| 2011/0089917 A1* | 4/2011 | Chen | H02M 3/1584 323/282 |
| 2012/0062031 A1* | 3/2012 | Buthker | H02M 3/158 307/31 |
| 2012/0286576 A1* | 11/2012 | Jing | H02M 3/158 307/43 |

OTHER PUBLICATIONS

Solis et al., "87%-Efficient 330-mW 0.6-um Single-Inductor Triple-Output Buck-Boost Power Supply," IEEE Transactions On Power Electronics, vol. 33, No. 8, Aug. 2018.

* cited by examiner

*Primary Examiner* — Rafael O De Leon Domenech
(74) *Attorney, Agent, or Firm* — Brake Hughes Bellermann LLP

(57) ABSTRACT

A circuit to control the peak current of a single inductor multiple output (SIMO) power converter operating in continuous current mode (CCM) is disclosed. The circuit generates a peak-current threshold signal that can be raised or lowered based on an error signal generated by comparing output voltages to their respective regulated levels. Additionally, the circuit can lower the peak-current threshold signal when an energy storage element of the SIMO power converter is in a freewheeling state. The lowering can occur at a rate that continues as long at the freewheeling state persists. The disclosed circuits and methods allow the peak-current threshold to converge on a level that facilitates the sufficient charging of the energy storage element to provide enough energy to the outputs but not excessive charging so as to increase ohmic loss associated with the freewheeling state.

18 Claims, 7 Drawing Sheets

US 11,374,493 B2

CIRCUIT AND METHOD FOR ADJUSTING AN INDUCTOR CURRENT IN A POWER CONVERTER

FIELD OF THE DISCLOSURE

The present disclosure relates to analog microelectronics and more specifically to a single-inductor multiple-output (SIMO) DC-DC converter operable in a continuous conduction mode (CCM).

BACKGROUND

Single-Inductor-Multiple-Output (SIMO) DC-DC converters (i.e., SIMO power converters) can be used for mobile and internet-of-things (IoT) applications because they can provide multiple regulated DC voltages at a plurality of outputs. Because the SIMO power converters share an energy storage element, they can have a smaller printed circuit board (PCB) footprint, a higher reliability, and/or lower cost as compared to other power-management integrated-circuits (PMIC). A SIMO power converter can operate in a discontinuous current mode (DCM) in which the inductor current is zero for a portion of a switching cycle or can operate in a continuous current mode (CCM), in which the inductor current is non-zero during the entire switching cycle. In CCM operation, it may be necessary to charge the energy storage element with enough energy to regulate each output during a cycle but to not charge the energy storage so high that energy is wasted. It is in this context that implementations of the disclosure arise.

SUMMARY

In at least one aspect, the present disclosure generally describes a system for power conversion. The system includes a single inductor multiple output (SIMO) power converter that includes a plurality of switches. The switches are configurable (i.e., controllable) to place an inductor in, at least, a charging state, a discharging state, or a freewheeling state. The system further includes a state machine that is coupled to the SIMO power converter. The state machine is configured to output switching signals to configure the plurality of switches according to a state. The system further includes an analog control coupled between the SIMO power converter and the state machine. The analog control is configured to compare sensed signals from the SIMO power converter to thresholds. Based on the comparisons, the analog control can configure the state of the state machine. The analog control includes a peak-current threshold circuit that is configured to adjust a peak-current threshold, which corresponds to a peak current that the inductor is charged to during the charging state, according to a total output voltage error and the freewheeling state of the SIMO power converter.

In a possible implementation, the peak-current threshold control circuit includes an error amplifier that is configured to compare an output voltage from each output of the SIMO power converter to a respective threshold and to output an error signal based on the comparisons. The peak-current threshold control circuit further includes a low-pass filter that is configured to integrate the error signal and output the peak-current threshold. The peak-current threshold control circuit further includes a freewheeling circuit that is configured to reduce the peak-current threshold while the inductor is in the freewheeling state.

In another aspect, the present disclosure generally describes a method for adjusting a peak current of a SIMO power converter during a cycle of a CCM of operation. The method includes charging an inductor of the SIMO power converter and sequentially coupling the charging inductor to output in a first group of outputs to charge respective output voltages. The method further includes sensing that an inductor current is at a peak-current threshold and (as a result) discharging the inductor of the SIMO power converter. The method further includes sequentially coupling the discharging inductor to outputs in a second group of outputs to charge respective output voltages of the outputs. The method further includes detecting that the inductor is in a freewheeling state and (as a result) adjusting the peak-current threshold based on the freewheeling state. In a possible implementation, the adjusted peak-current threshold can be applied to a subsequent cycle of the SIMO power converter (e.g., to reduce a current in the inductor during the freewheeling state).

In another aspect, the present disclosure generally describes a peak-current threshold control circuit for a SIMO power converter. The peak-current threshold control circuit includes an error amplifier that is configured to generate a peak-current threshold signal based on a total difference between output voltages of the SIMO power converter and their respective regulated levels. The peak-current threshold control circuit further includes a freewheeling circuit configured to reduce the peak-current threshold signal when the SIMO power converter is in a freewheeling state. In a possible implementation the peak-current threshold control circuit further includes a filter to smooth changes in time to the peak-current threshold signal.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
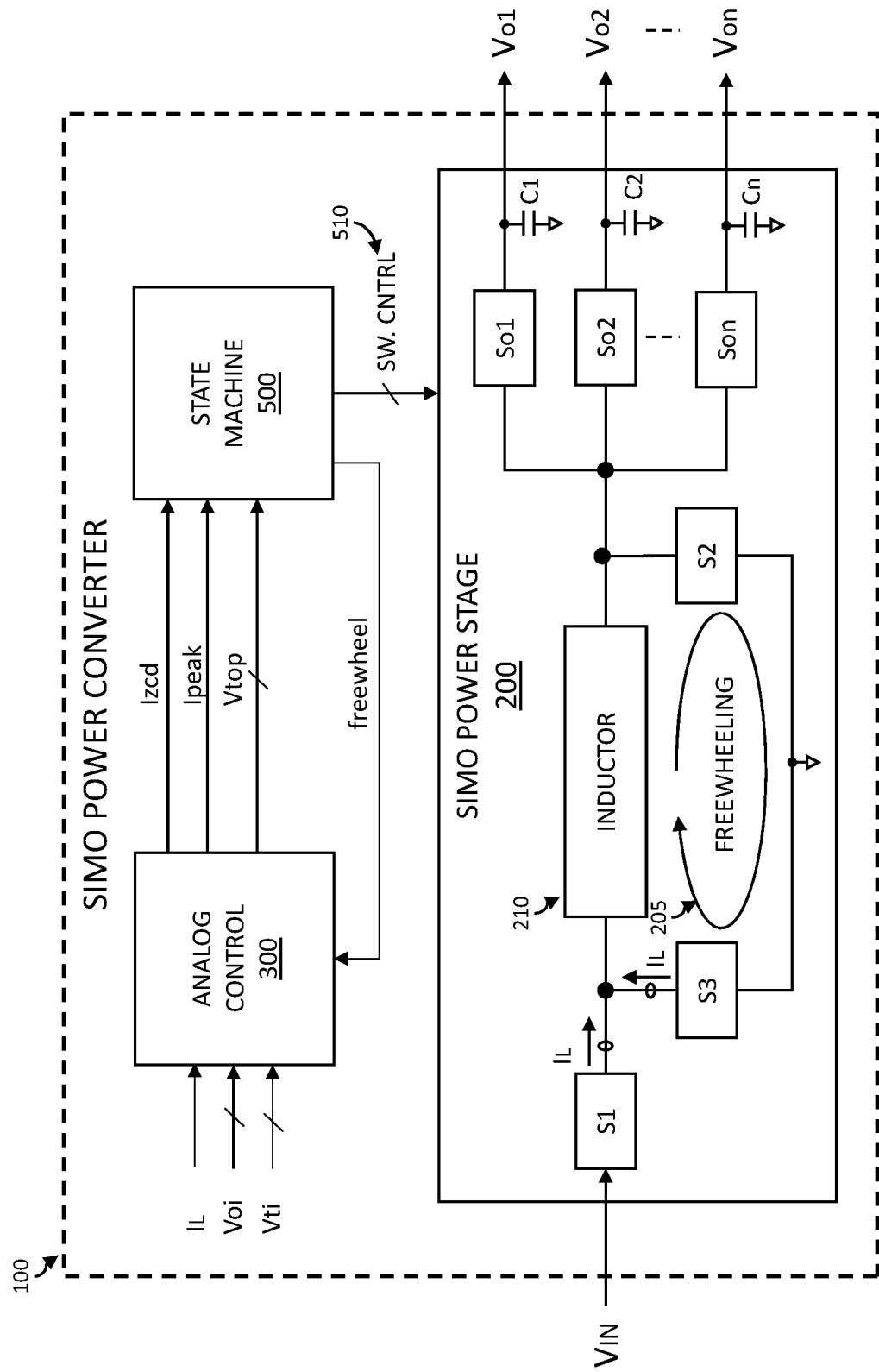
FIG. 1 is a block diagram of a SIMO power converter according to an implementation of the present disclosure.

FIG. 1 illustrates a SIMO power converter according to an implementation of the present disclosure. The SIMO power converter 100 includes a SIMO power stage 200. Based on an input voltage ($V_{IN}$), the SIMO power stage 200 is configured to output a plurality of output voltages (i.e., $V_{O1}$, $V_{O2}, \ldots, V_{On}$) at a plurality of outputs. The plurality of output voltages may result from various types of DC-DC conversion, such as buck conversion, boost conversion, and buck-boost conversion.

The SIMO power stage 200 utilizes a single energy storage element (e.g., an inductor 210) to supply energy to the plurality of outputs. During a cycle, each output can receive energy (e.g., current) from the energy storage element to charge a respective capacitor (i.e., $C_1, C_2, \ldots C_n$) in order to maintain a regulated voltage (i.e., $V_{O1}$, $V_{O2}, \ldots, V_{On}$) at each output. For example, during a cycle, a first output capacitor is fully charged (e.g., charged to a regulated voltage level), then a second output capacitor fully changed, and so on until all outputs have been charged to their respective levels. The voltage levels of each output may be the same or different.

The SIMO power stage 200 includes a plurality of output switches ($S_{o1}, S_{o2}, \ldots, S_{on}$). Each output switch can be configured to couple the inductor 210 to a particular output. For example, when the output switch $S_{o1}$ in an ON condition (i.e., is ON), the capacitor ($C_1$) for the first output can receive energy from (or through) the inductor 210 to increase an output voltage ($V_{o1}$). When the output switch $S_{o1}$ is in an OFF condition (i.e., is OFF), the capacitor ($C_1$) for the first output is decoupled from the inductor 210. In the OFF condition, the output voltage ($V_{o1}$) may decrease as a load coupled to the output draws current ($I_{o1}$) from (i.e., discharges) the capacitor ($C_1$) at the output. A cycle may begin when one or more of the output voltages drop to (or below) a threshold, and a cycle may end when all of the output voltages are charged to (or above) a threshold.

The SIMO power stage 200 further includes a plurality of inductor switches ($S_1, S_2, S_3$). The ON/OFF states of the inductor switches can control how energy is exchanged with or stored in the inductor 210. For example, in a first inductor switch state (e.g., $S_1$=ON, $S_3$=OFF, $S_2$=OFF), the inductor 210 may be charged (i.e., when the output voltage that is less than the input voltage (i.e., buck conversion)), and an output may be coupled to the energy storage element to receive charge from the charging energy storage element. In a second inductor switch state (e.g., $S_1$=OFF, $S_3$=ON, $S_2$=OFF), the inductor 210 may be discharged, and an output may be coupled to the energy storage element to receive charge from the discharging energy storage element. In a third inductor switch state (e.g., $S_1$=OFF, $S_3$=ON, $S_2$=ON), the energy in the energy storage element may be stored (e.g., by recirculating 205 a current). This state may be referred to as the freewheeling state of the energy storage element (e.g., a freewheeling state of the inductor). These states may be the states most used during a cycle but other inductor switch states can exist.

In a fourth inductor switch state (e.g., $S_1$=ON, $S_3$=OFF, $S_2$=ON), the energy in the energy storage element may be charged. This state may be part of a boost conversion process. In a fifth inductor switch state (e.g., $S_1$=OFF, $S_3$=OFF, $S_2$=OFF), the energy in the inductor 210 may be decoupled from the input and the output. This state may be referred to as a dwell state. This state may be part of DCM operation and is only possible when the inductor current is zero.

Figure 2:
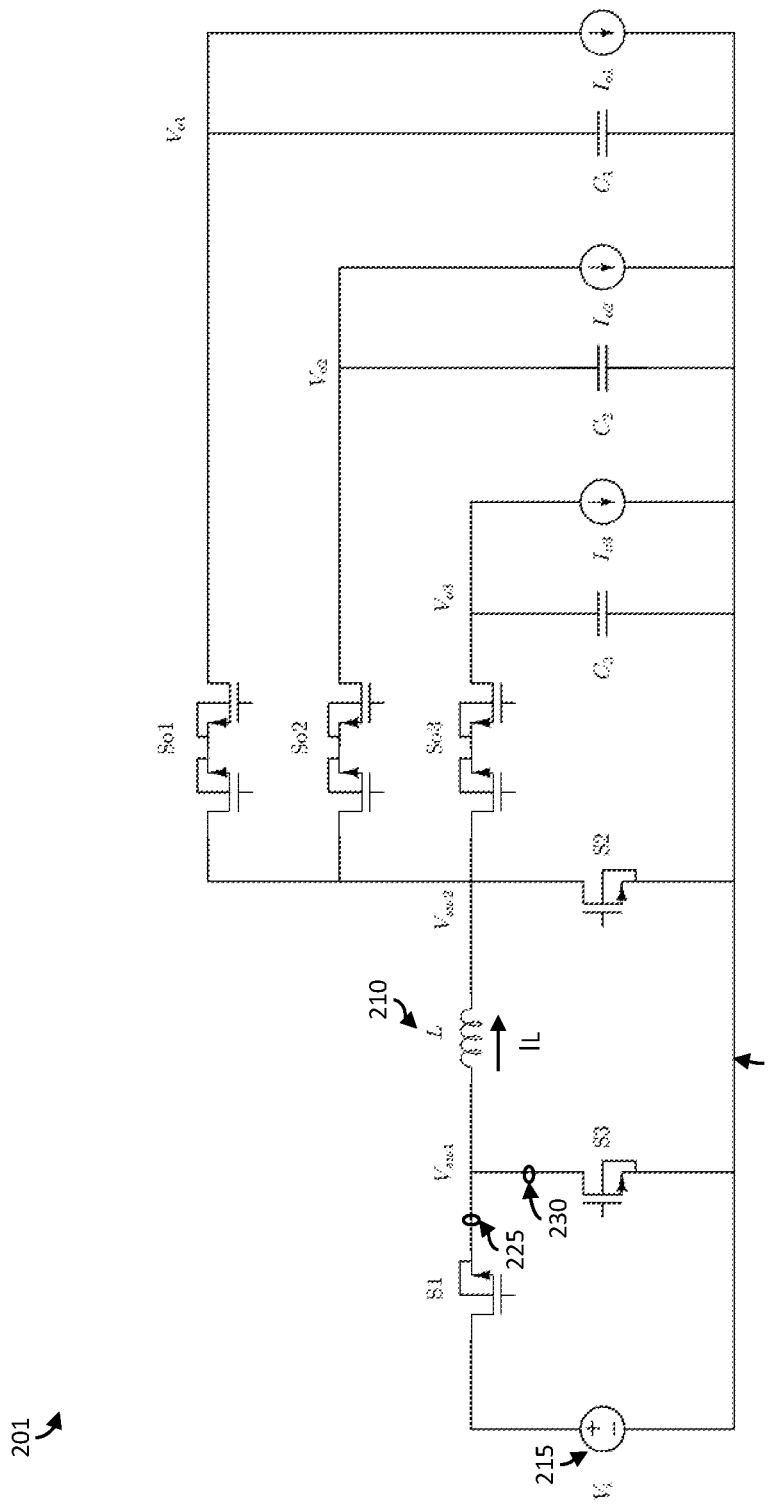
FIG. 2 is a schematic of an example SIMO power stage for the SIMO power converter of FIG. 1.

FIG. 2 schematically illustrates an example SIMO power stage 201 that can be used with the SIMO power converter shown in FIG. 1. The example SIMO power stage 201 includes three outputs. As shown in FIG. 2, an inductor 210 (L) is shared among three outputs. The input side of the inductor 210 can be coupled to either an input voltage source 215 or a ground voltage 220, using inductor switches $S_1$ or $S_3$ respectively. The output side of the inductor can be coupled to any of the outputs using output switches $S_{o1}$, $S_{o2}$, or $S_{o3}$ respectively. Additionally, the output side of the inductor can be coupled to the ground voltage 220 using the inductor switch $S_2$. The three output switches ($S_{o1}, S_{o2}, S_{o3}$) can be implemented with back-to-back NMOS transistors while the inductor switches ($S_1, S_2, S_3$) can be implemented with signal NMOS transistors.

The SIMO power converter 201 may also include current sensors. For example, a first current sensor 225 can be configured to measure the inductor current ($I_L$) while the inductor 210 is charging (i.e., $S_1$=ON, $S_3$=OFF) and a second current sensor 230 can be configured to measure the inductor current ($I_L$) while the inductor is discharging (i.e., $S_1$=OFF, $S_3$=ON). The current sensors may help determine when a peak inductor current (Ip) is reached as well as when an inductor current becomes zero (e.g., zero crossing detection). In one possible implementation, each current sensor can be implemented as a current-controlled voltage source. In another possible implementation, each current sensor can be implemented as current mirrors in a senseFET configuration.

The SIMO power stage 201 may further include voltage sensor at each output. For example, the SIMO power stage 201 may include a first voltage sensor to measure the first output voltage $V_{o1}$, a second voltage sensor to measure the second output voltage $V_{o2}$, and a third voltage sensor to measure the third output voltage $V_{o3}$. In the example, output voltages of the SIMO power stage 201 will be assumed to be less than the input voltage (i.e., buck conversion), but it should be understood that each output can be of any conversion type and the outputs may be of the same type or of different types.

The ON/OFF states of the plurality of switches ($S_1, S_2, S_3$, $S_{o1}, S_{o2}, S_{o3}$) can be configured by a state machine 500 that is configured to output switch control signals 510 based on the sensor measurements. The state machine may move from a first state to a second state when the sensor measurements change. For example, at the beginning of a cycle, a first output voltage $V_{o1}$ (i.e., first output) may be charged (i.e., increased). When the first output voltage reaches a reference level (e.g., a regulated value), the state machine may change states and configure the SIMO power stage to begin charging a second output voltage ($V_{o2}$). When the second output voltage reaches a reference level (e.g., a regulated value), the state machine may change states and configure the SIMO power stage to begin charging a third output voltage ($V_{o3}$). This process may continue until all n-outputs have been charged.

In the example, the energy storage element is an inductor 210. In this case, at the beginning of a cycle, the state machine may couple the inductor to an input voltage ($V_{IN}$) so that power is provided to a coupled output from the input voltage. As the outputs are sequentially charged during a cycle, a current of the inductor steadily increases as the inductor is charged. When the inductor current reaches its maximum (i.e., peak) value (i.e., when the inductor becomes fully charged), the inductor can be decoupled from the input to begin discharging. While discharging, the inductor may continue to be coupled to outputs to continue the sequential charging of the output.

Figure 3A:
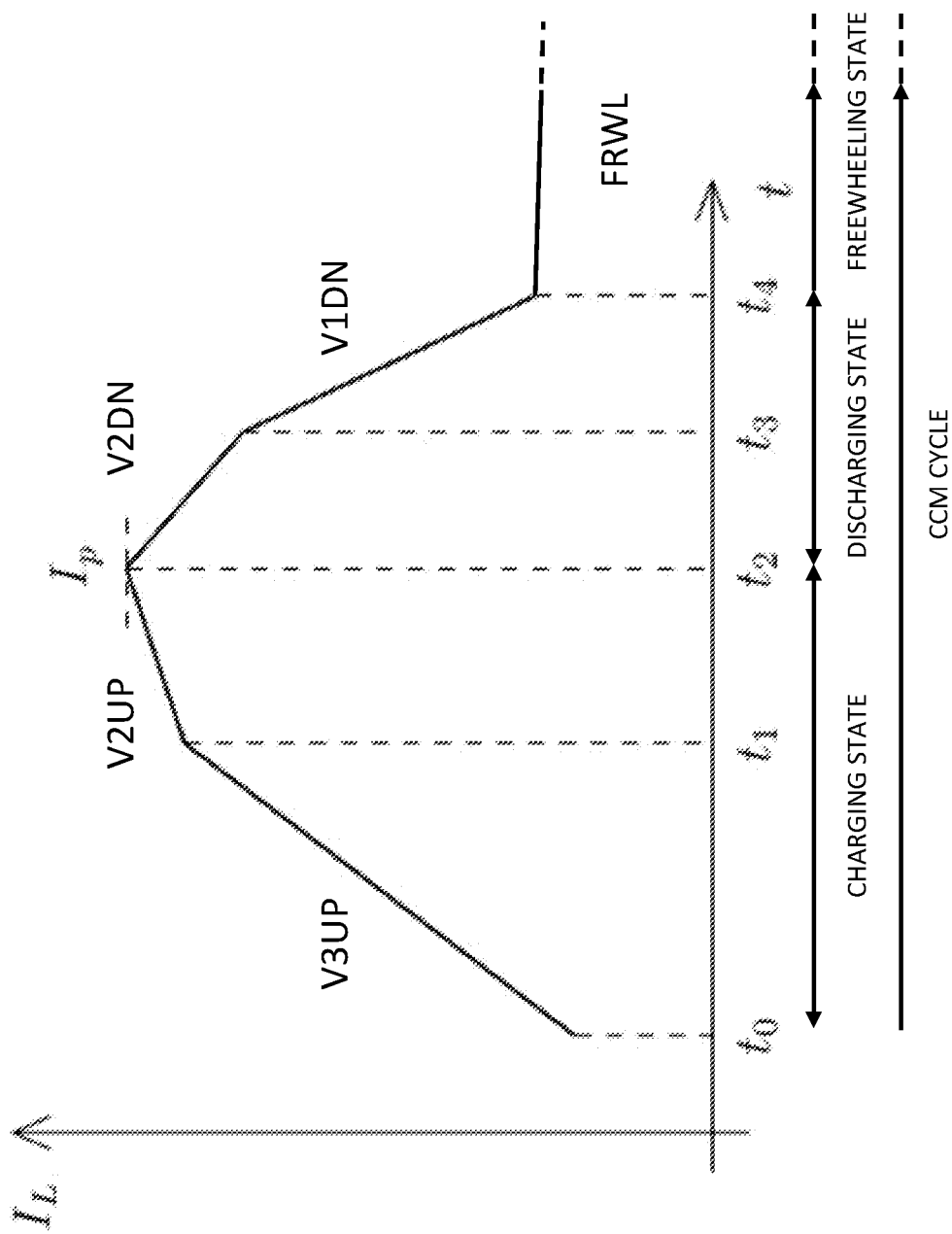
FIG. 3A is a graph of inductor current in the example SIMO power stage of FIG. 2 during a possible cycle.
Figure 3B:
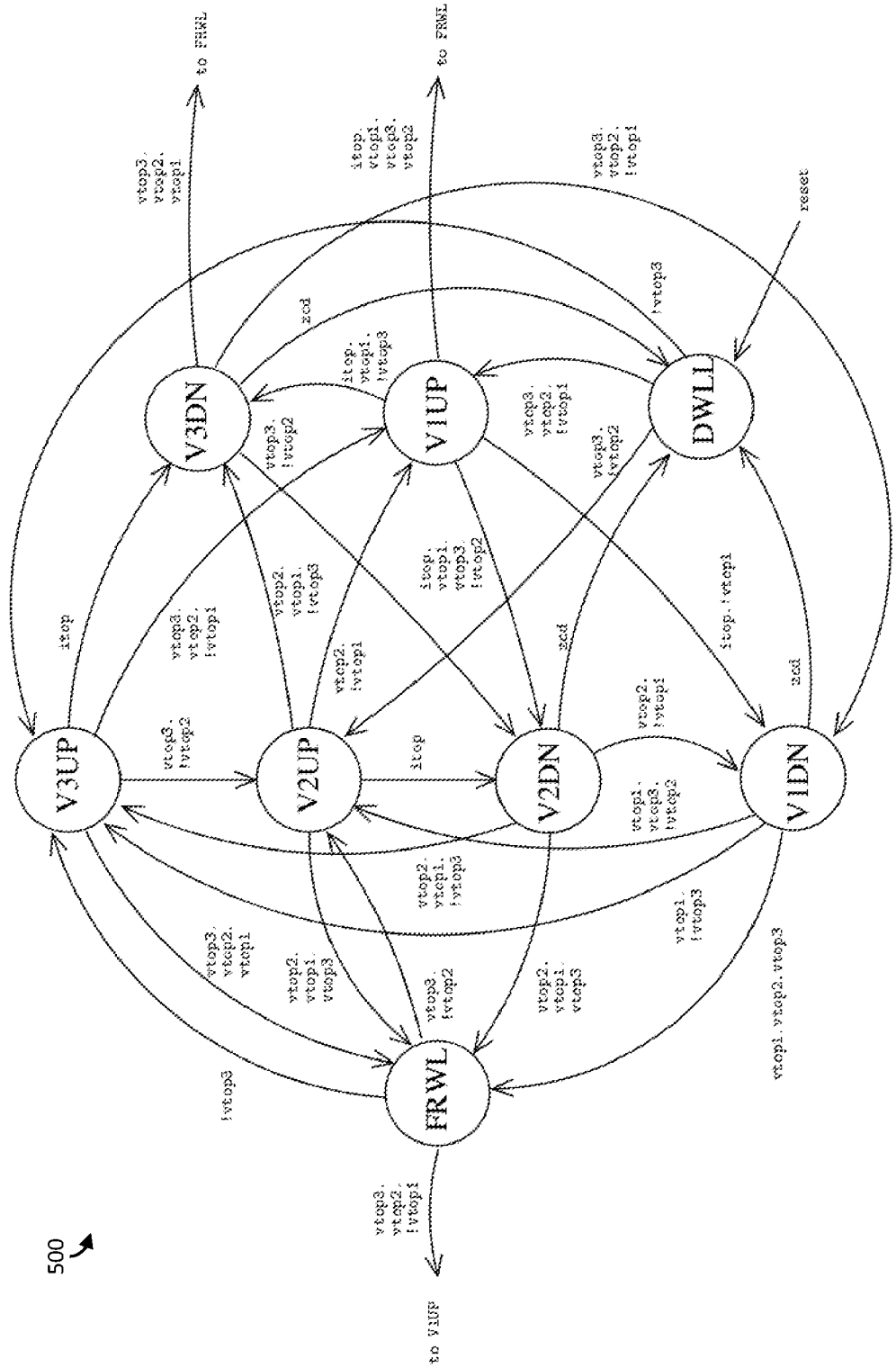
FIG. 3B is a state diagram of state machine for control of the SIMO power stage of FIG. 2.

FIG. 3A is a time-based graph of an inductor current during a possible cycle of a SIMO power converter. The inductor current may correspond to a plurality of states such as shown in a state diagram of FIG. 3B. At a beginning ($t_0$) of the cycle the inductor current ($I_L$) is non-zero from a previous cycle's freewheeling state. In the implementation shown, the outputs can be sequentially charged in the following order: $V_{o3}$, $V_{o2}$, $V_{o1}$. Accordingly, at a time ($t_0$) corresponding to the beginning of the cycle, the state machine, as shown in FIG. 3B, enters the V3UP state, in which $V_{o3}$ is charged (i.e., increased) from the input voltage (Vi) source through the (charging—UP) inductor 210 (i.e., $S_1$=ON, $S_{o3}$=ON). While in this state, the output voltage ($V_{o3}$) of the third output is monitored by a voltage sensor and compared to a threshold to determine when the output is fully charged. Additionally, the inductor current is monitored by a sensor and compared to a threshold to determine when the inductor has reached a peak (i.e., maximum) current. In the implementation shown, the third output becomes fully charged at a time ($t_1$) that is before the inductor current has reached its prescribed peak ($I_P$). Accordingly, the state machine moves to the V2UP state and the switches of the SIMO power converter 200 are configured to charge the second output (i.e., $S_1$=ON, $S_{o2}$=ON). At the time ($t_2$) when the inductor reaches its peak current ($I_p$), the second output is not completed charged. Accordingly, the state machine moves into a V2DN state in which the second output continues to receive charge from a (now) discharging inductor (i.e., $S_3$=ON, So2=ON). At a time ($t_3$) at which the second output reaches its full charge, the state machine moves into a V1DN state in which the first output receives charge form the discharging capacitor (i.e., $S_3$=ON, $S_{o1}$=ON). At a time ($t_4$) at which all outputs have been charged (i.e., are at or above their respective threshold values), the cycle ends and the state machine enters the freewheeling (FRWL) state in which the remaining inductor current ($I_L$) is circulated in the inductor (i.e., $S_3$=ON, $S_2$=ON). Switch states of the of the example SIMO power converter shown in FIG. 2 are summarized in TABLE 1.

TABLE 1

States of example converter shown in FIG. 2

| STATE | SWITCHES ON |
| --- | --- |
| OUTPUT STATE | |
| CHARGING OUTPUT 1 ($V_{o1} < V_{t1}$) | $S_{o1}$ and ($S_1$ or $S_3$) |
| CHARGING OUTPUT 2 ($V_{o2} < V_{t2}$) | $S_{o2}$ and ($S_1$ or $S_3$) |
| CHARGING OUTPUT 3 ($V_{o3} < V_{t3}$) | $S_{o3}$ and ($S_1$ or $S_3$) |
| INDUCTOR STATE | |
| CHARGING INDUCTOR ($I_L < I_P$) | $S_1$ |
| DISCHARGING INDUCTOR ($I_L = I_P$ until end of cycle) | S3 |
| FREEWHEELING ($V_{O1} \geq V_{REG1}$, $V_{o2} \geq V_{REG2}$, $V_{o3} \geq V_{REG3}$) | $S_3$ and $S_2$ |

Depending on the peak-current threshold and the amount of current required for each output the transition from charging inductor to discharging inductor may occur during the charging of any of the outputs. In other words, the charging inductor may be coupled in sequence to outputs in a first group of outputs (i.e., to charge their respective output voltage) before the inductor current reaches its peak value, and the discharging inductor may be coupled in sequence to the remaining outputs that require charging (i.e., a second group of outputs) after the inductor reaches its peak value.

The SIMO power stage 200 can operate in a discontinuous current mode (DCM) of operation or a continuous current mode (CCM) of operation. In DCM, the energy stored in the inductor is completely discharged into the outputs during the cycle so that at the start of the next cycle the inductor is again charged from zero energy to the high energy. In a continuous current mode (CCM) of operation, however, the inductor not discharged completely during the cycle. CCM may offer advantages including lower peak inductor currents (i.e., smaller inductor size) necessary to supply an amount of power to each output.

If a cycle is completed without depleting the charge of the inductor, the SIMO power stage can be placed in a freewheeling state until a subsequent cycle is started or until no current remains circulating. In the freewheeling state, the inductor is configured in a short circuit loop (e.g., $S_3$=$S_2$=ON) so that the inductor current can circulate 205 until the next cycle when it can be reused. Some inductor current (i.e., energy) may be lost during freewheeling state due to ohmic losses.

The period of circulation (i.e., a freewheeling period) may vary from cycle-to-cycle because a new cycle may not begin until at least one of the outputs falls below its reference (i.e., regulated) value (e.g., by a threshold amount). The amount of current lost during the freewheeling period can affect (i.e., reduce) the efficiency of the SIMO power converter. In order to improve efficiency, it may be desirable to reduce the amount of current remaining in the inductor at the end of the cycle. In other words, it may be desirable to reduce the peak current ($I_P$) of the inductor. Reducing the peak current too low, however, can result in discharging the inductor completely before the outputs are all charged (i.e., DCM operation). As a result, one or more output voltages may fall a regulated level (i.e., may become unregulated).

It may be preferable to determine a preferred (e.g., optimal) peak current threshold (i.e., setting) that can provide a good efficiency without entering DCM operation and/or losing regulation. A single peak current setting may not satisfy these requirements, however, because the preferred peak current setting may vary from cycle-to-cycle as load conditions change. The disclosed circuits, systems, and methods can automatically adjust a peak current to converge (e.g., over one or more cycles) on a value that optimizes a SIMO power converter's efficiency while maintaining CCM operation. The adjustment of the peak current may include adjusting a peak-current reference (i.e., threshold) and this adjustment can be based on the output voltages and freewheeling period duration.

Figure 4:
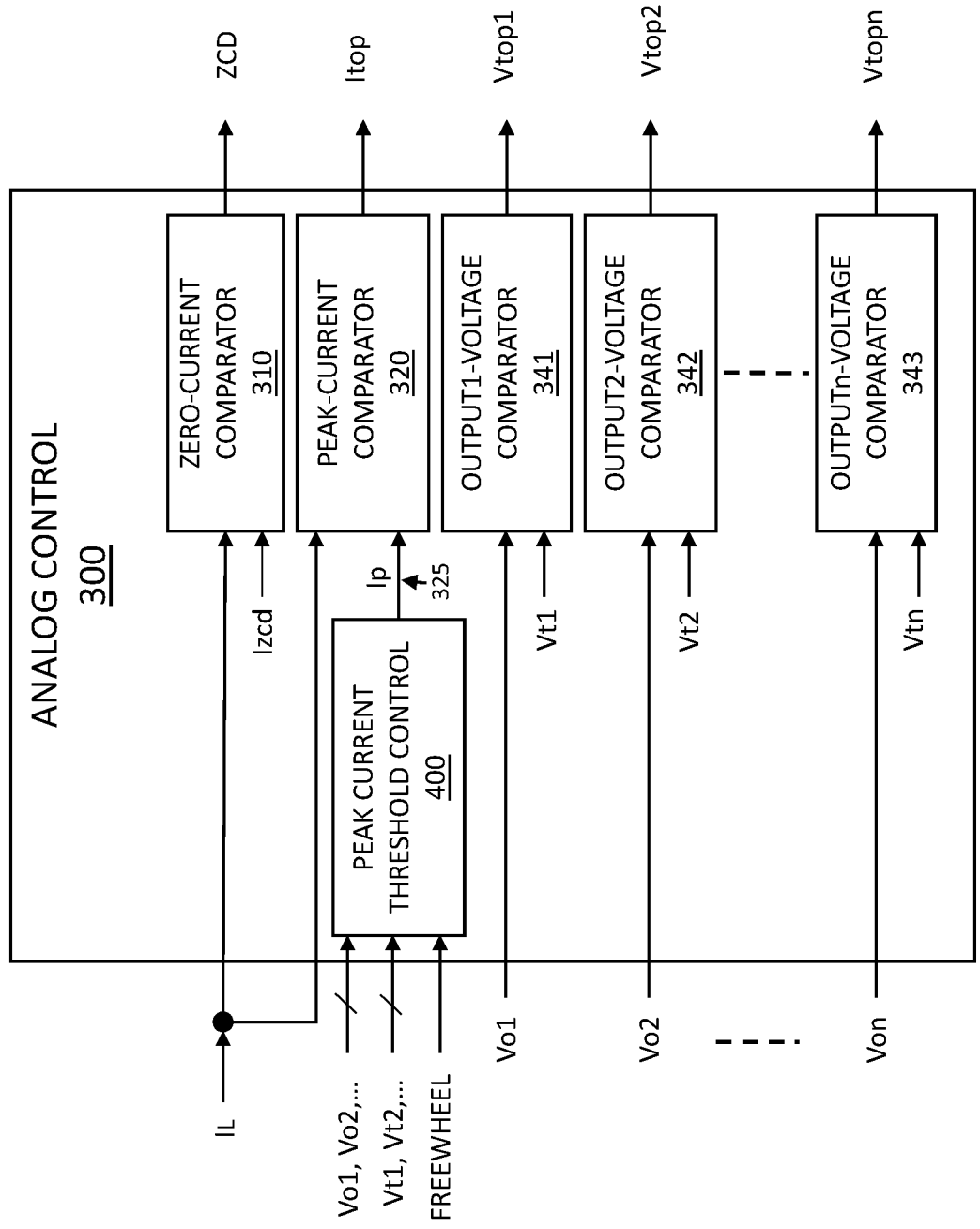
FIG. 4 is a block diagram of a possible analog control circuit for the SIMO power converter of FIG. 1.

FIG. 4 is a block diagram illustrating a possible implementation of the analog control circuit (i.e., analog control 300) for the power conversion system shown in FIG. 1. The analog control is configured to receive the sensed output voltages (e.g., $V_{o1}$, $V_{o2}$, $V_{o3}$) and the sensed inductor current ($I_L$) from a SIMO power converter, compare these voltages and currents to predetermined thresholds (i.e., reference levels), and based on the comparison, output state factors. The state factors can be binary values that determined a state of a particular voltage or current in the SIMO power converter 200. The state factors can be coupled to the state machine 500 to configure the state machine 500 in a particular state (e.g., see FIG. 3B). Based on the particular state, the state machine 500 can output switch control signals 510 to configure each switch in the SIMO power converter in an ON state or an OFF state.

The analog control 300 is configured to receive a sensed inductor current ($I_L$). The sensed inductor current may result from sensing a current through a first switch ($S_1$) when the inductor is charging and through a second switch ($S_3$) when the inductor is discharging. The analog control can include a zero-current comparator 310 configured to compare the sensed inductor current level to a zero-current threshold ($I_{ZCD}$) in order to determine if the inductor current is zero (i.e., zero-crossing detector). Based on the comparison, the zero-current comparator can output a state factor (ZCD) having a level (e.g., a voltage) that indicates whether the inductor current is zero or non-zero. This state factor (ZCD) can cause the state machine to move to a state related to DCM (e.g., DWLL).

The analog control 300 can further include a first output-voltage comparator 341 configured to compare a sensed output voltage level ($V_{o1}$) for the first output to a first output threshold ($V_{t1}$) (i.e., first regulated level) in order to determine if the output voltage ($V_{o1}$) is above or below the first output threshold. Based on the comparison, the output-voltage can output a state factor ($V_{top1}$) having a level (e.g., a voltage) that indicates whether the output is at its regulated level (i.e., value) or has fallen below its regulated level. In a possible implementation, the first output-voltage comparator 341 is a comparator with hysteresis (i.e., a hysteresis comparator) having an upper and lower threshold so that a drop in the output voltage must exceed an amount before the state factor ($V_{top1}$) is changed from a level indicating that the output is at a regulated level to a level indicating the output is below the regulated level.

The analog control 300 can further include additional output voltage comparators 342, 343 corresponding to each additional output of the SIMO power stage. Each output-voltage comparator can be configured to compare a corresponding output voltage (i.e., $V_{o1}$, $V_{o2}$, ... $V_{on}$) to a respective threshold (i.e., $V_{t1}$, $V_{t2}$, ... $V_{tn}$) in order to generate a corresponding state factor (i.e., $V_{top1}$, $V_{top2}$, ... $V_{topn}$) that corresponds to the charged state (i.e. regulated level) of the output. In a possible implementation, each output-voltage comparator is a comparator with hysteresis (i.e., a hysteresis comparator) having an upper and lower threshold.

The analog control 300 can further include a peak-current comparator 320 configured to compare the sensed inductor current level ($I_L$) to a peak-current threshold 325 ($I_p$) (i.e., maximum inductor current, peak inductor current) in order to determine if the inductor current is at a maximum level. Based on the comparison, the peak-current comparator can output a state factor ($I_{top}$) having a level (e.g., a voltage) that indicates whether the inductor current is at (or above) the peak current ($I_P$). This state factor ($I_{top}$) can correspond to a transition between a state corresponding to a charging current (e.g., V1UP, V2UP, V3UP) and a state corresponding to a discharging current (e.g., V1DN, V2DN, V3DN).

The analog control 300 can further include a peak threshold control circuit (i.e., peak-threshold control 400) that is configured to adjust the peak-current threshold 325 ($I_P$) in order to decrease the amount of current left in the inductor at the end of a cycle without discharging the inductor completely during the cycle. The adjustment of the peak-current threshold can be based on the output voltages (i.e., $V_{o1}$, $V_{o2}$, ... $V_{on}$) and/or a freewheeling state (i.e., FRWL, FREEWHEEL) of the SIMO power stage 200.

Figure 5:
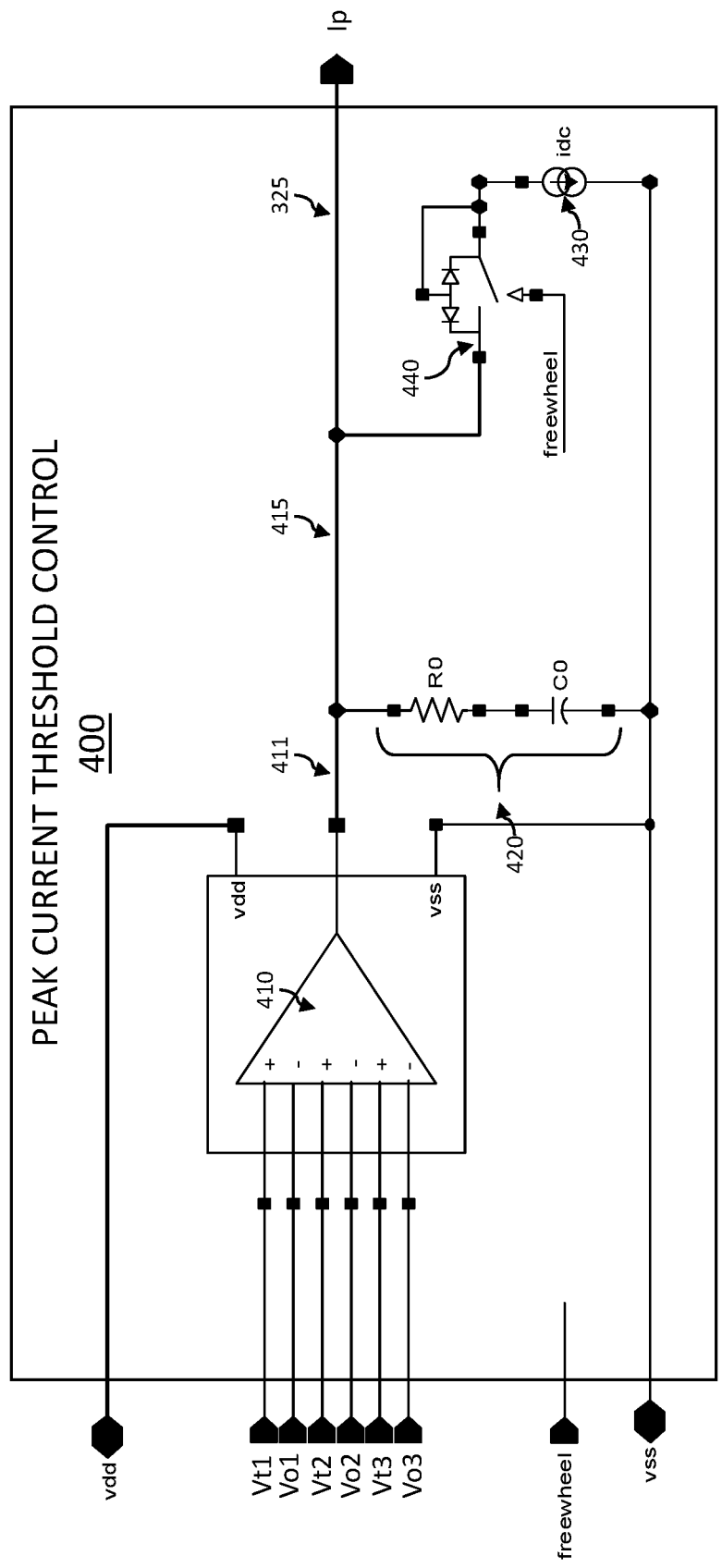
FIG. 5 is a block schematic of a possible peak-current threshold control circuit for the analog control circuit of FIG. 4.

FIG. 5 is a block schematic of a possible peak-current threshold control circuit for the analog control circuit of FIG. 4. The peak-current threshold control 400 can increase the peak-current threshold so that during a cycle, the inductor 210 can be charged to a higher peak current (Ip) (e.g., than a previous cycle). For example, a large voltage change (e.g., drop) in one or more of the outputs of the SIMO power stage 200 may cause the peak threshold control 400 to increase the peak-current threshold (Ip) so that additional current may be supplied to the outputs during the next cycle. The peak-current threshold increase may prevent the inductor 210 from becoming completely discharged during a subsequent (e.g., the next) cycle.

The peak-current threshold control 400 can also decrease the peak-current threshold so that during a cycle, the inductor 210 is charged to a lower peak current (Ip) than a previous cycle. The peak threshold control circuit may receive a freewheel signal (i.e., FREEWHEEL) from the state machine 500. While the state machine is in in a freewheeling state (e.g., see FRWL in FIG. 3B), the peak-current threshold can be decreased at a constant rate. In other words, the decreased in the peak-current threshold can be proportional to the freewheeling period.

FIG. 5 is a schematic of a possible implementation of the peak-current threshold control 400. The circuit is configured to receive output voltages ($V_{o1}$, $V_{o2}$, $V_{o3}$) from the outputs of the SIMO power stage 200. The received output voltages are input to an error amplifier 410 that is configured to compare each output voltage to a threshold (i.e., a reference) ($V_{t1}$, $V_{t2}$, $V_{t3}$) in order to obtain an error for each output (i.e., $V_{t1}$-$V_{o1}$, $V_{t2}$-$V_{o2}$, $V_{t3}$-$V_{o3}$). The error amplifier 410 is further configured to output an error signal 411 that is a sum of all of the errors (i.e. total output voltage error). The thresholds for each output voltage may be the same or different. For example, a first output voltage ($V_{o1}$) may be compared to a first threshold voltage ($V_{t1}$) to obtain a first error (e.g., err1=$V_{t1}$-$V_{o1}$), a second output voltage ($V_{o2}$) may be compared to a second threshold voltage ($V_{t2}$) to obtain a second error (e.g., err2=$V_{t2}$-$V_{o1}$), and a third output voltage ($V_{o3}$) may be compared to a third threshold voltage (Vt3) to obtain a third error (e.g., err3—$V_{t3}$-$V_{o3}$). The output of the error amplifier (i.e., the total output voltage error) may be signal corresponding (i.e., proportional) to the sum of the errors (i.e., err1+err2+err3). In some implementations, the error amplifier 410 is an operational transconductance amplifier (OTA) and the output signal is a current corresponding to the sum of the errors.

The peak-current threshold control 400 may further include a filter. For example, the output of the error amplifier 410 may be coupled to a low-pass filter (i.e., LP filter 420). The LP filter 420 can be configured to integrate (i.e., smooth) the output of the error amplifier 410. In other words, the control of the peak-current threshold control may be a proportional-integral (PI) control. The LP filter 420 may be implemented as series resistor-capacitor (RC) circuit coupled between the output of the error amplifier and a ground (VSS) voltage. The output of the LP filter is coupled to an output of the peak-current threshold control. In other words, the LP filter outputs filtered-error signal 415. In the absence of a freewheeling period, the peak-current threshold 325 ($I_P$) may increase or decrease according to the filtered-error signal 415.

The peak-current threshold control 400 may further include a constant current source 430 that is coupled to the LP filter 420 via a switch 440. The switch 440 is controlled by a signal (freewheel) from the state machine indicating that the inductor of the SIMO power converter is in a freewheeling state. The switch can be activated (i.e., ON) when the SIMO power converter 200 is in the freewheeling state and deactivated (i.e., OFF) when the SIMO power converter 200 is not in the freewheeling state. The signal corresponding to the freewheeling state can configure the switch 440 to couple the current source 430 to the output of the peak-current threshold control circuit. When coupled the current source 430 can pull-down (i.e., decreases, reduces) the filtered-error signal so that the peak-current threshold 325 is lowered. The reduction in the peak-current threshold is at a constant rate so that the peak-current threshold is reduced more for longer freewheeling periods than for shorter freewheeling periods.

The adjustment of the peak-current threshold 325 using both the output signals (e.g., voltages) and the freewheeling signal facilitates peak inductor current (Ip) converging (e.g., over one or more cycles) at a level that is high enough to provide the energy needed by all outputs, but is low enough to minimize the time spent in the freewheeling state, thus minimizing ohmic losses.

Figure 6:
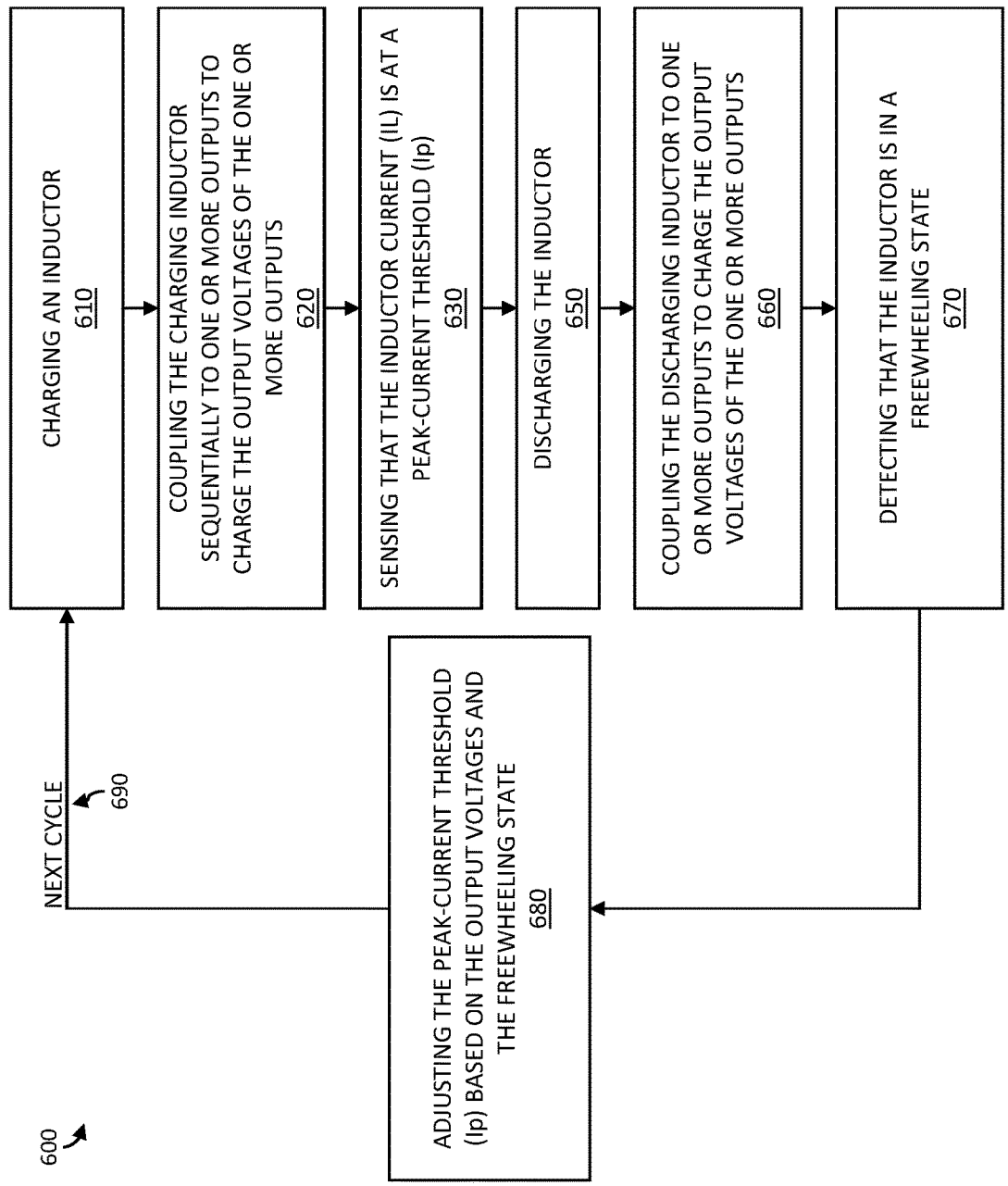
FIG. 6 is a flowchart of a method for adjusting a peak current of a SIMO power converter during a cycle of a CCM operation according to a possible implementation of the present disclosure.

FIG. 6 is a flowchart of a method for adjusting a peak current of a SIMO power converter during a cycle of a CCM operation. The method includes (at the start of a cycle) charging 610 an inductor of the SIMO power converter. The method further includes coupling 620 the charging inductor sequentially to one or more outputs in order to charge output voltages of the one or more outputs. The sequence and the and the amount of charging provided to each output can be controlled by a state machine 500. The state machine can be configured in a state based on sensed parameters (e.g., output voltages, inductor current) received from SIMO power converter 200. Based on the state, the state machine can generate signals to configure the switches (e.g., $S_1$, $S_2$, $S_3$, $S_{o1}$, $S_{o2}$, $S_{on}$) of the SIMO power converter to control the charging of the one or more outputs. The method further includes sensing 630 that the inductor current ($I_L$) is at a peak-current threshold ($I_P$) (i.e., is at a peak current) and discharging the inductor 650 as a result. The method further includes coupling 660 the discharging inductor to one or more outputs to charge the output voltages of the one or more outputs. The method further includes detecting 670 that the inductor is in a freewheeling state. The method further includes adjusting 680 the peak-current threshold ($I_P$) based on the output voltages (Vo1, Vo2, . . . Von) and the freewheeling state, and applying 690 the adjusted peak-current threshold to the next cycle.

The adjustment of the peak-current threshold can include comparing the output voltages to corresponding references to determine an error for each output and then summing the errors to produce an error signal. The error signal may be filtered (e.g., smoothed in time) to create a filtered-error signal. In the absence of a freewheeling state, the filtered error signal can control the peak current (Ip) of the inductor for a subsequent (e.g., next) cycle. For example, the peak current (Ip) may increase in proportion to an increase in the errors of the outputs. When a cycle has a freewheeling state, however, the filtered error signal may be reduced to lower the peak current for a subsequent (e.g., next) cycle. The reduction can be accomplished using a constant current source 430 to pull down the output (e.g., drain a capacitor in the LP filter). The pull down of the output is controlled by a switch, which remains ON as long the inductor remains in the freewheeling state. In a possible implementation, the peak-current threshold (Ip) can be held within a range. For example, Ip may be clamped so that it does not increase above a maximum level. This upper limit clamping can limit the maximum inductor current that can circulate during a cycle. The peak-current threshold (Ip) can also be clamped so that it does not decrease below a minimum level. This lower limit clamping can maintain a minimum amount of energy available for transfer to the outputs each cycle.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A single inductor multiple output (SIMO) power converter comprising:
   a SIMO power stage configured output a plurality of output voltages, the SIMO power stage including a plurality of switches that are configurable to place an inductor in a charging state, a discharging state, or a freewheeling state during a cycle of the SIMO power stage;
   a state machine that is coupled to the SIMO power stage, the state machine configured to output switching signals to configure the plurality of switches according to a state of the cycle; and
   an analog control coupled to between the SIMO power stage and the state machine, the analog control configured to compare sensed signals from the SIMO power stage to thresholds, and based on the comparisons, configure the state machine to output switching signals according to the state of the cycle, the analog control including a peak-current threshold control circuit configured to adjust a peak-current threshold according to the plurality of output voltages when the inductor is in the freewheeling state, the peak-current threshold corresponding to a peak current that the inductor is charged to during the charging state.

2. The SIMO power converter according to claim 1, wherein a cycle of the SIMO power converter includes a transition between the charging state and the discharging state when a current in the inductor reaches the peak-current threshold.

3. The SIMO power converter according to claim 1, wherein the peak-current threshold control circuit includes:
a freewheeling circuit configured to lower the peak-current threshold.

4. The SIMO power converter according to claim 3, wherein the peak-current threshold is lowered at a constant rate while the inductor of the SIMO power stage is in the freewheeling state.

5. The SIMO power converter according to claim 3, wherein the freewheeling circuit includes a switch and a constant current source, the switch configured by a freewheeling signal from the state machine.

6. The SIMO power converter according to claim 1, wherein the peak-current threshold control circuit includes:
an error amplifier configured to compare an output voltage from each output of the SIMO power stage to a respective threshold and to output an error signal based on the comparisons;
a low-pass filter configured to integrate the error signal and output the peak-current threshold; and
a freewheeling circuit configured to reduce the peak-current threshold while the inductor is in the freewheeling state.

7. The SIMO power converter according to claim 6, wherein the error amplifier is an operational transconductance amplifier.

8. The SIMO power converter according to claim 6, wherein the error signal corresponds to a sum of differences between each output of the SIMO power stage and a respective threshold.

9. The SIMO power converter according to claim 6, wherein the freewheeling circuit includes a switch and a constant current source configured lower the peak current threshold at a constant rate corresponding to a current level of the constant current source while the switch is activated.

10. The SIMO power converter according to claim 9, wherein the switch is configured to couple the constant current source to an output of the low-pass filter by a signal that indicates that the inductor is in the freewheeling state.

11. The SIMO power converter according to claim 1, wherein the freewheeling state of the inductor is part of a cycle of a CCM operation of the SIMO power converter.

12. The SIMO power converter according to claim 1, wherein the analog control includes a comparator configured to compare a sensed inductor current to the peak-current threshold and based on the comparison configuring the inductor in the charging state or a discharging state.

13. A method for adjusting a peak current of a single inductor multiple output (SIMO) power converter during a cycle of a constant current mode (CCM) of operation, the method comprising:
charging an inductor of the SIMO power converter;
coupling, sequentially, the charging inductor to outputs in a first group of outputs to charge respective output voltages of outputs in the first group;
sensing that an inductor current is at a peak-current threshold;
discharging the inductor of the SIMO power converter;
coupling, sequentially, the discharging inductor to outputs in a second group of outputs to charge respective output voltages of the outputs in the second group;
determining the inductor is in a freewheeling state based on a freewheeling signal received from a state machine, the state of the freewheeling signal corresponding to the freewheeling state; and
adjusting the peak-current threshold based on the freewheeling state.

14. The method according to claim 13, wherein the adjusting the peak-current threshold includes:
reducing the peak-current threshold at a constant rate while the inductor is in the freewheeling state.

15. The method according to claim 13, wherein:
the peak-current threshold corresponds to differences between output voltages and their respective regulated levels.

16. The method according to claim 13, wherein:
applying the adjusted peak-current threshold to a subsequent cycle of the SIMO power converter.

17. A peak-current threshold control circuit for a single inductor multiple output (SIMO) power converter, the peak-current threshold control circuit including:
an error amplifier configured to generate a peak-current threshold signal based on total difference between output voltages of the SIMO power converter and their respective regulated levels;
a filter configured to smooth changes in time to the peak-current threshold signal; and
a freewheeling circuit configured to reduce the peak-current threshold signal when the SIMO power converter is in a freewheeling state.

18. The peak-current threshold control circuit for a SIMO power converter according to claim 17, wherein:
the freewheeling circuit includes a constant current source that pulls down an output of the filter to reduce the peak-current threshold signal at a constant rate while the constant current source is coupled to an output of the filter, the freewheeling circuit further including a switch configured to couple the constant current source to the output of the filter based on a signal from a state machine indicating that the SIMO power converter is in a freewheeling state.

* * * * *